United States Patent [19]
Imai et al.

[11] Patent Number: 5,173,612
[45] Date of Patent: Dec. 22, 1992

[54] X-RAY WINDOW AND METHOD OF PRODUCING SAME

[75] Inventors: Takahiro Imai; Naoji Fujimori, both of Hyogo, Japan

[73] Assignee: Sumitomo Electric Industries Ltd., Osaka, Japan

[21] Appl. No.: 744,332

[22] Filed: Aug. 13, 1991

[30] Foreign Application Priority Data

Sep. 18, 1990 [JP] Japan .................. 2-249846

[51] Int. Cl.⁵ .............................. G21K 1/00
[52] U.S. Cl. ................ 250/505.1; 378/161
[58] Field of Search ............ 250/505.1; 378/161

[56] References Cited

U.S. PATENT DOCUMENTS

| | | | |
|---|---|---|---|
| 4,939,763 | 7/1990 | Pinneo et al. | 378/161 |
| 4,998,267 | 3/1991 | Lee et al. | 378/35 |
| 5,039,203 | 8/1991 | Nishikawa | 359/894 |

FOREIGN PATENT DOCUMENTS

| | | |
|---|---|---|
| 365366 | 4/1990 | European Pat. Off. |
| 58-91100 | 5/1983 | Japan. |

Primary Examiner—Bruce C. Anderson

[57] ABSTRACT

An X-ray window having a diamond X-ray transparent film, diamond reinforcing crosspieces and a substrate on which the diamond X-ray transparent film has been grown. As reinforcing crosspieces are made of diamond, no thermal stress is generated between the X-ray transparent film and the crosspieces. This mask excels in flatness, transmittance of X-rays, and strength.

6 Claims, 3 Drawing Sheets

X-RAY WINDOW AND METHOD OF PRODUCING SAME

FIELD OF THE INVENTION

This invention relates to an X-ray window which will be mounted on an X-ray introducing opening of X-ray detectors; especially to an X-ray window with high transparency for X-rays, high flatness, and high strength.

Recently analyzing apparatuses which measure properties of material by detecting X-rays have been obtaining wide scopes of application in various fields of technology. The performance of the analyzing apparatuses utilizing X-rays has been rising to a great extent.

BACKGROUND OF THE INVENTION

Among such X-ray analyzing apparatuses, the energy dispersive X-ray microspectrometers (EDX) have been applied to analysis of various materials, because they enable us to analyze two-dimensional distribution of elements with high resolution by easy operation.

Besides the energy dispersive X-ray microspectrometers, the applications of the X-ray measurement apparatuses, e.g. X-ray telescopes, have been widening.

In these X-ray measurement apparatuses, X-ray detectors must be protected from the contamination by open air. Thus, an X-ray transparent window should be settled between an X-ray detector and open air. Especially, if the detector is a semiconductor detector, an X-ray window is indispensable for protecting the semiconductor detector from the contamination.

By these reasons, the need for good X-ray windows has been increasing. First, as the properties of the material of good X-ray windows, high transparency for X-rays is required. Glass optics which are properly employed for visible light or ultraviolet light are of no use for X-rays, because the absorption of X-rays of glass is too large. Secondly high strength is required for X-ray windows. An X-ray window must be very thin in order to decrease the absorption of X-rays and visible lights. Thus, such material as is strong enough even in the form of a very thin film is required for the basic material of X-ray windows.

Conventional X-ray windows for energy dispersive X-ray microspectrometers have employed beryllium as the material of the film. In addition to EDXs, beryllium windows have been used as the X-ray windows for synchrotron orbital radiation. Beryllium is strong enough even in the form of a thin film. The absorption of X-rays is comparatively small, because the atomic weight of beryllium is small. However, even beryllium windows must be thicker than several tens of microns to ensure the mechanical strength as a window. Such thick beryllium windows exhibit strong absorption for the X-rays scattered from light atoms, e.g. nitrogen atoms. Thus, the kinds of detectable elements are restricted for the X-ray detector with a beryllium window.

If an X-ray detector were used without an X-ray window, the X-ray detector would be contaminated in all probability. Therefore, almost all X-ray detectors are unavoidably equipped with beryllium windows at the expense of the sensitivity for light elements. This is the present state of X-ray windows.

Diamond has extremely high Young's modulus. Thus, it is believed that a very thin diamond film can keep its own shape because of the high rigidity. Besides, diamond has low absorption coefficient for X-rays. Diamond has been deemed a promising material for X-ray windows. However, the difficulty of processing diamond has been preventing a diamond X-ray window from being put into practice. It is difficult to polish a bulk diamond monocrystal till a thin film. There had been no good method for growing diamond thin film on a non-diamond substrate until late.

However, recent developments of the chemical vapor deposition methods have enabled us to grow diamond films or quasi-diamond carbon films on a pertinent substrate. Such a probability to make X-ray windows with a diamond film becomes within our reach. An X-ray window having a diamond film would be able to keep its inherent shape, even if it was thinner than 1 μm, because of the high Young's modulus. Thus, the X-ray windows having a diamond transparent film would enjoy the advantages that the absorption of X-rays by the transparent film would be able to be decreased by thinning the diamond transparent film.

However, X-ray windows are generally used under severe environment. In the case of the energy dispersive X-ray microspectrometer, there is a considerable difference of pressure between the front and the back of the X-ray window. The pressure difference makes the X-ray window press inward. In the case of X-ray cosmic telescopes, impulsive acceleration acts on X-ray windows. In these cases, high mechanical strength is required for the X-ray window. A diamond film thinner than a few micrometers cannot satisfy the requirement for strength.

On the contrary, a thick diamond film which has sufficient mechanical strength would not be desirable because of the large absorption of X-rays.

Then, an X-ray window having a diamond film reinforced by silicon crosspieces as shown in FIG. 3 was invented. EP 36,533 disclosed on Apr. 25, 1990 proposed this reinforced window.

In FIG. 3, an X-ray transparent film (1) is sustained by a silicon ring substrate (3), although the peripheral part of the substrate (3) is left unetched, the central part is partially etched. Thus the substrate is called a ring substrate. The unetched parts constitute reinforcing crosspieces (12). The crosspieces (12) are made from silicon, because they are originally parts of silicon substrate (3). A supporter frame (4) is glued to the periphery of the silicon ring substrate (3). There are the diamond X-ray transparent film and the silicon reinforcing crosspieces in the range through which X-rays are transmitted. X-rays must pass through the silicon crosspieces (12) as well as the diamond film (1). The X-rays will attenuate by the silicon crosspieces because silicon has big absorption for X-rays. This X-ray window has the advantage of facile fabrication, because the crosspieces of silicon are made only by etching away parts of the center of the silicon substrate (3).

In addition, the inventors of the present invention had proposed another X-ray window having a diamond X-ray transparent film reinforced by the crosspieces which is fabricated by evaporation-coating nickel, chromium or other metals with high rigidity in a lattice structure, e.g. lengthwise and crosswise on the diamond film. This is Japanese Patent Application NO. 1-308174 filed on Nov. 28, 1989.

The inventors had proposed another X-ray window having a diamond film reinforced by silicon crosspieces in Japanese Patent Application NO. 1-308173 filed on Nov. 28, 1989.

The silicon crosspieces were made by bombarding boron ions lengthwise and crosswise on a silicon substrate, depositing diamond on the silicon substrate, and etching away the silicon substrate. Since the portions of the silicon substrate bombarded by boron ions are not etched, the residual boron-doped parts become the crosspieces.

The X-ray windows having silicon crosspieces made by etching selectively the central part of a silicon substrate on which a diamond film was grown have the following disadvantages.

Thermal expansion coefficient of silicon differs from that of diamond. As the growth of diamond by the vapor phase synthesis is done at considerable high temperature, strong thermal stress will be generated between the silicon crosspieces and the diamond film by the difference of thermal expansion coefficients, when the specimen is cooled down to room temperature. Therefore, the windows are likely to be broken or distorted, when they are fitted to X-ray measuring apparatuses.

Other X-ray windows having crosspieces made from rigid metals except silicon also have the same disadvantage. Besides the disadvantage, the use of non-silicon metals for the crosspieces will complicate the fabrication procession, which takes us a lot of time and money.

The purpose of this invention is to provide an X-ray window which excels in X-ray transmittance, mechanical strength and suppression of thermal stress.

SUMMARY OF THE INVENTION

The X-ray window of this invention essentially comprises a diamond X-ray transparent film and diamond reinforcing crosspieces selectively deposited on the diamond X-ray transparent film.

DETAILED DESCRIPTION OF THE EMBODIMENTS

Figure 1:
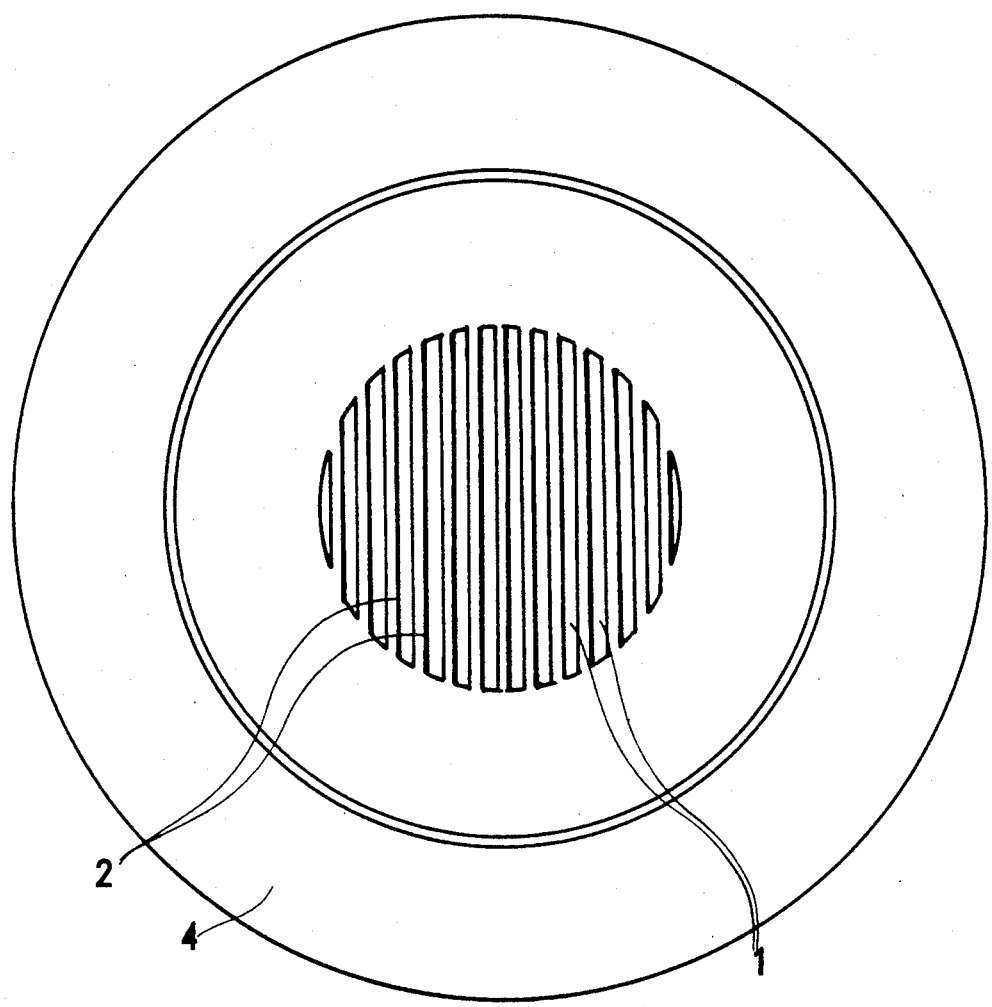
FIG. 1 is a plan view of an X-ray window as an embodiment of this invention.

An example of this invention will now be explained by referring FIG. 1 and FIG. 2.

A flat, circular X-ray transparent film (1) is made from diamond. A ring substrate (3) is a substrate, e.g. silicon substrate, on which the diamond film is grown. Reinforcing crosspieces (2) made from diamond are fabricated on the diamond X-ray transparent film (1).

An opening through which X-rays pass is perforated at the center of the substrate (3). Namely, the substrate (3) is partially etched away except the periphery. Thus it is called a ring substrate. A supporter ring (4) is stuck to the periphery of the ring substrate (3). In the example, the reinforcing crosspieces (3) are fabricated only on the central part of the X-ray transparent film (1). The periphery of the reinforcing diamond film is a flat film without holes or grooves.

Figure 3:
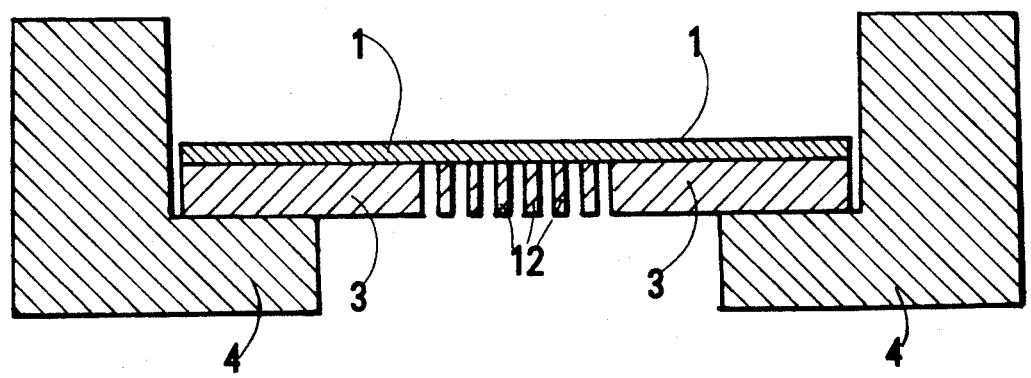
FIG. 3 is a vertical sectional view of a conventional X-ray window.

In comparison with the window shown in FIG. 3, an additional diamond film for reinforcing is deposited on the surface of the transparent form opposite to the silicon substrate. The reinforcing diamond film is partially etched to shape the reinforcing crosspieces at the center. The reinforcing diamond film is thicker than the diamond X-ray transparent film. In the embodiment, the reinforcing crosspieces are vertically-continuing parallel ones. In this embodiment, the supporter ring (4) is stuck to the rear surface of the silicon substrate (3). Alternatively the supporter ring (4) may be stick to the front surface of the reinforcing diamond film containing the crosspieces (2).

Furthermore in the embodiment, the reinforcing crosspieces (2) and the substrate (3) sandwich the X-ray transparent film (1) therebetween. But other versions will be allowed. The diamond reinforcing crosspieces (2) may be formed on the rear surface of the diamond X-ray transparent film (1) in the opening (8) of the substrate (3).

Regarding the patterns of the crosspieces, lattice patterns with members parallel in two directions; lengthwise and crosswise, or a repetition of regular polygons will be allowable instead of the single-parallel patterns.

The thickness of the diamond X-ray transparent film (1) is preferably 0.05 $\mu$m to 10 $\mu$m. The thickness of the diamond reinforcing crosspieces (2) should be thicker than that of the transparent film (1) for reinforcing the transparent film (1) effectively, concrete thicknesses of the diamond transparent film (1) and the diamond reinforcing film containing the crosspieces should be determined by considering the X-ray transmittance required for the windows and the forces which will act on the mask.

Figure 4:
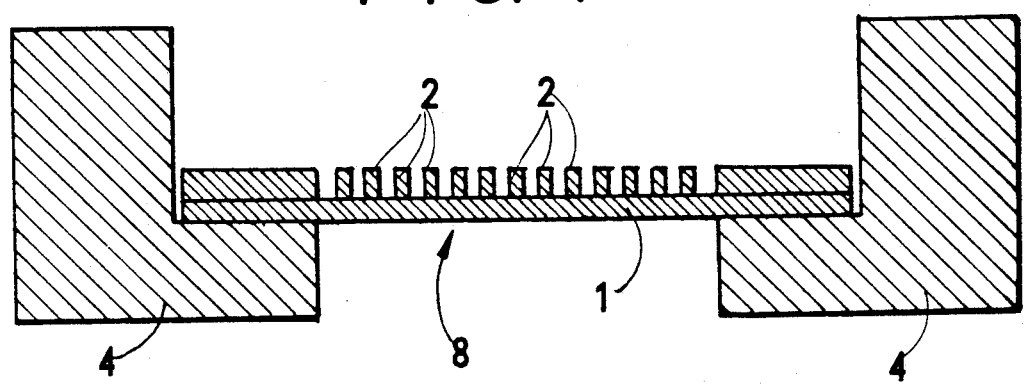
FIG. 4 is a vertical sectional view of another X-ray window as another embodiment of this invention.

The substrate is dispensable for the X-ray window, although it is necessary to deposit a diamond film thereupon at the first stage of fabrication. It is possible to etch away whole of the substrate without losing mechanical strength for an X-ray window by determing the width, the height and the spacing of the crosspieces appropriately. The embodiment without the substrate is shown in FIG. 4. In comparison with the first embodiment shown in FIG. 1, the silicon substrate (3) has been completely eliminated, and a supporter ring (4) has been directly glued to the periphery of a diamond X-ray transparent film (1). This window has a diamond reinforcing crosspieces (2), the X-ray transparent film (1) and the supporter ring (4) from top to bottom. Alternatively, the supporter ring (4) can be stick to the periphery of the reinforcing diamond film.

In any embodiments, the substrate (3) is a substrate on which diamond is grown. Thus, the material of the substrate must resist against the temperature higher than 400° C. which the diamond synthesis requires. Besides the high heat resistance, the substrate must easily be etched away, because whole of or parts of the substrate will be etched after the growth of diamond thereon. To satisfy these requirements, the substrate is preferably made from semiconductors, e.g. silicon (Si), germanium (Ge) or gallium arsenide (GaAs) or high melting point metals, e.g. molybdenum (Mo) or tungsten (W).

The surface of the substrate on which diamond will grow is mirror-polished to satisfy the requirement of flatness. However, it is more preferable to prepolish the raw substrate by diamond powder with diameters shorter than 10 $\mu$m.

The advantages of this invention are now explained. Both the X-ray transparent film and the crosspieces are made from diamond in the X-ray window of the invention. Change of temperature induces no thermal stress between the X-ray transparent film and the crosspieces, because of the same thermal expansion coefficient. Thus this mask enjoys good flatness.

The X-ray transparent film is made from diamond which inherently excels in strength and is still reinforced by a lot of crosspieces. The window will be able to hold sufficient strength even if the X-ray transparent film is thinner than 1 μm. The transmittance of this mask is far higher than the conventional beryllium window, because diamond is inherently more transparent to X-rays than beryllium and the mask of this invention is thinner than the beryllium window.

As mentioned before, the thickness of the crosspieces is bigger than that of the X-ray transparent film. However, the crosspieces can be as thin as a few micrometers. X-rays can pass through such thin crosspieces without significant energy loss. The intensity of X-rays which are transmitted through the window is big enough, because of the high transmittance which is defined as the product of thickness and transparency. The high transmittance of the window will contribute to rising the sensitivity of X-ray detectors.

Figure 2:
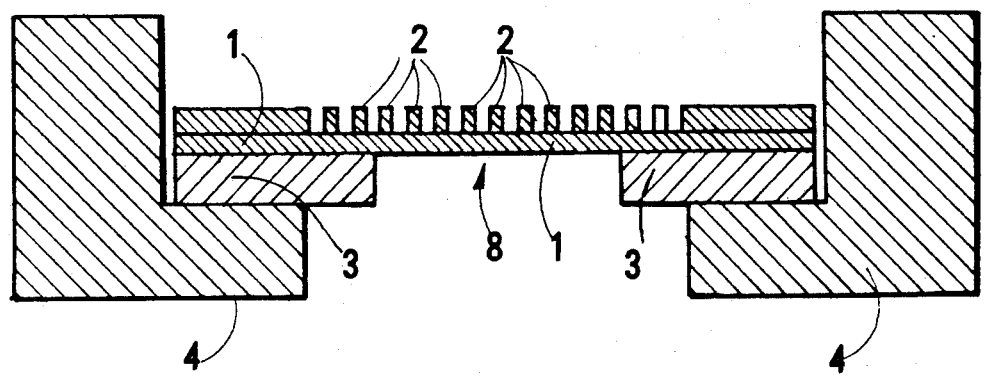
FIG. 2 is a vertical sectional view of the same X-ray window.

Regarding the thermal stress, a little thermal stress will be induced by change of temperature in the window shown in FIG. 1 and FIG. 2, because the silicon substrate remains partially. But the embodiment of FIG. 4 is perfectly immune from the problem of thermal stress, because the silicon substrate has been completely removed.

Figure 5:
FIG. 5A-C are vertical sectional views showing the steps of fabricating the X-ray window of this invention.
Figure 5:
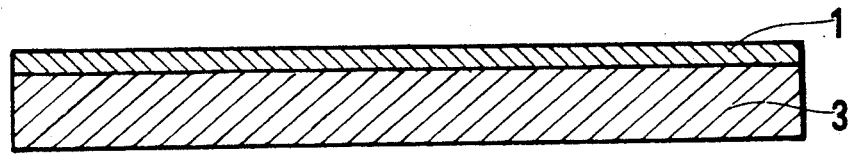
Figure 5C:
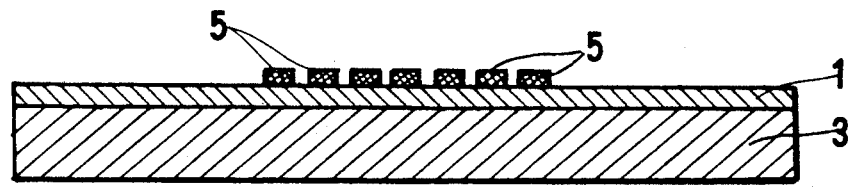
Figure 5D:
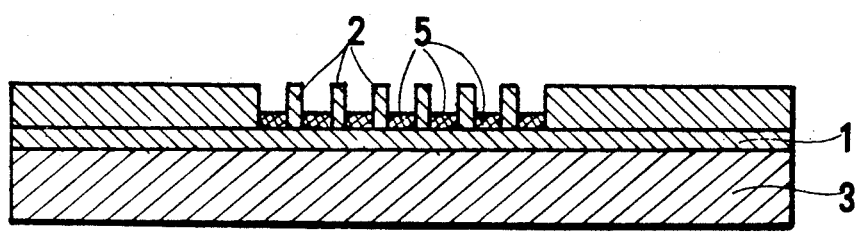
Figure 5E:
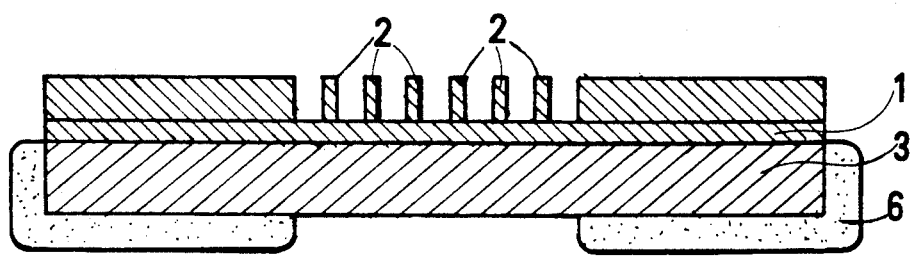
Figure 5F:
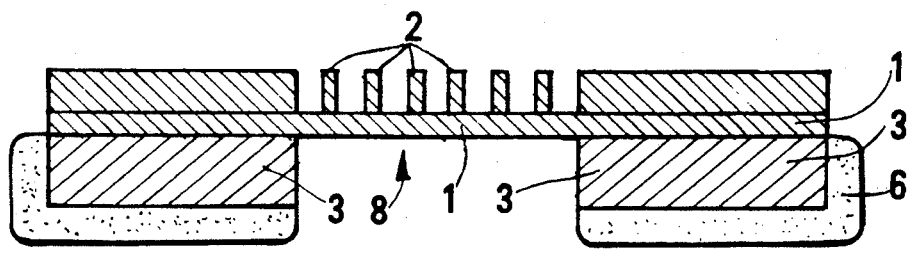
Figure 5G:
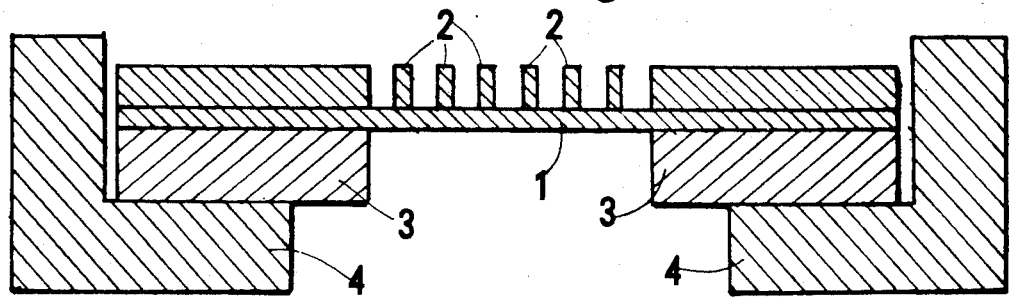

The method of producing the X-ray window will now been explained by referring to FIG. 5.

(a) A flat substrate, e.g. silicon (Si), germanium (Ge), gallium arsenide (GaAs), molybdenum (Mo) and tungsten (W) is mirror-polished.

(b) A diamond film is grown on the substrate (3) by a vapor phase synthesis method. The diamond film becomes the X-ray transparent film (1). The vapor phase synthesis method is a method comprising the steps of supplying a material gas, e.g. methane and a carrier gas, e.g. hydrogen on a heated substrate, exciting the gases by some means to induce vapor phase reaction and depositing the material borne by the reaction on the substrate. There are some variations with different means for excitation of gases in the vapor phase synthesis methods.

Thermal CVD (chemical vapor deposition) method (Japanese Patent Laying Open No. 58-91100), plasma CVD method (Japanese Patent Laying Open No. 58-135117, No. 58-110494), ion beam method, laser CVD method, and burner flame method have so far been proposed for synthesizing diamond. Among these vapor phase synthesis methods, the thermal CVD method or the plasma CVD method is appropriate for producing the X-ray transparent film and the crosspieces of this invention because of the uniformity of diamond growth.

The diamond X-ray transparent film should be 0.05 μm to 10 μm as explained before. Within the range, the concrete thickness of the diamond film should properly be determined by considering the scope of the wavelength of X-rays, the necessary transmittance for X-rays, and the required mechanical strength.

(c) A diamond-growth-inhibiting mask (5) having holes at the positions where crosspieces will be shaped is deposited on the central part of either surface of the X-ray transparent film (1). The diamond-growth-inhibiting mask is fabricated by evaporating tungsten (W), molybdenum (Mo), silicon (Si), germanium (Ge), nickel (Ni), chromiun (Cr) or titanium (Ti) on whole surface of the X-ray transparent film (1) and eliminating, by photolithography, the material at the positions where crosspieces will be shaped. Alternatively a similar mask may be prepared by setting on the film (1) a metal mask having holes with the same pattern of the crosspieces and evaporating the material mentioned above on the film covered with the metal mask. The material is deposited only on the positions which are not covered with the mask metal. The deposited material forms an equivalent diamond-growth-inhibiting mask.

In this example, the diamond-growth-inhibiting mask is formed on the side opposite to the substrate (3). Alternatively the diamond-growth-inhibiting mask can be formed also on the side of the substrate (3). In the version, the central part of the substrate (3) is eliminated and a diamond-growth-inhibiting mask shall be formed by the method similar to the former example.

(d) Diamond is grown on the surface covered with the diamond-growth-inhibiting mask (5) by a vapor phase synthesis method. No diamond growth occurs on the material of the mask. Anisotropic diamond growth continues at the holes of the mask beyond the height of the mask (5). The second diamond film is called a reinforcing film. The selective growth of diamond by using the diamond-growth-inhibiting mask was proposed by Japanese Patent Laying Open No. 1-123423.

(e) The diamond-growth-inhibiting mask (5) is etched away by acid or alkali. Crosspieces and a peripheral part of the reinforcing film remain. The peripheral part of the rear surface and the side of the substrate (3) is covered by photoresist (6). Only the central part of the substrate (3) is uncovered. Instead of the photoresist, the same part of the substrate may be otherwise covered by a diamond layer deposited by selective growth of diamond.

(f) The central part of the substrate is eliminated by dry etching or wet etching.

(g) The photoresist (6) is eliminated. A supporter ring (4) is fitted to the periphery of the substrate (3).

Thus, the X-ray window of this invention is produced by the steps above.

So far the material of the film (1) and the crosspieces (2) have been called "diamond". Here the definition of "diamond" of this invention must be clarified. "Diamond" is such a material mainly consisting of carbon in which the existence of crystalline diamond is confirmed by the X-ray diffraction method, the electron beam diffraction method or the Raman scattering spectrometry. Inclusion of non-diamond carbon, e.g. graphite, amorphous carbon, or quasi-diamond carbon is allowable.

The "diamond" is also allowed to include small amount of non-carbon materials, e.g. boron (B), nitride (N), oxygen (O), aluminum (Al), silicon (Si), phosphor (P), titanium (Ti), tungsten (W), tantalum (Ta), iron (Fe), nickel (Ni) as impurities. Especially, the inclusion of boron (B) less than 1000 ppm will convert an insulating diamond to a semiconductor diamond by supplying positive holes. The conversion by boron lowers the electric resistance and suppresses the occurrence of electrification (or charge-up) of the mask when it is irradiated by X-rays.

EMBODIMENTS

More concrete method for producing the X-ray windows of this invention is now explained. Silicon wafers with the diameter of 15 mm$\phi$ to 0.3 m$\phi$ (300 mm$\phi$) were used as a substrate on which diamond is grown. Here, an example of a 15 mm$\phi$ wafer is described. A diamond film was grown up to 0.3 $\mu$m of thickness on either of surface of the silicon wafer by the microwave plasma CVD method using the mixture of methane gas (CH$_4$) and hydrogen gas (H$_2$) as a material gas. This film was confirmed to be crystalline diamond having a 1333 cm$^{-1}$ peak in the Raman scattering by the Raman scattering spectrometry.

Molybdenum was evaporated on the diamond film covered with a metal mask having the same patterns as the crosspieces to be produced. Since molybdenum was deposited only on the positions which are not covered with the mask metal, the deposited molybdenum becomes a diamond-growth-inhibiting mask having grooves of 15 $\mu$m width separated each other by 50 $\mu$m spacing.

Diamond was again grown up to the thickness of 20 $\mu$m on the first diamond film (1) partially covered with the diamond-growth-inhibiting mask (5) by the microwave plasma CVD method same as the former growth. After the second diamond film had deposited on the first diamond film, the diamond-growth-inhibiting mask (5) was etched away by a solution of potassium hydroxide. A lot of parallel crosspieces with a 15 $\mu$m width and a 20 $\mu$m height separating each other by a 50 $\mu$m spacing remain.

The peripheral part of the rear surface and the side of the silicon substrate were covered with photoresist (6). The central part of a diameter of 7 mm$\phi$ of the silicon substrate was solved away by fluoric-nitric acid. The specimen having the substrate, the diamond transparent film and the crosspieces was fixed to an aluminum supporter ring (4). The X-ray windows shown in FIG. 1 and FIG. 2 were obtained.

The X-ray window was mounted on an X-ray detector to measure the transmittance performance for nitrogen K$\alpha$ X-rays. Then output power of the X-rays transmitted through the diamond window was measured. Then, an open window having a silicon substrate with a 7 mm$\phi$ hole without diamond film was also mounted on the same X-ray detector instead of the diamond window. Then, output power of the X-rays transmitted through the open window, namely through only air, was also measured. The output power of the former case (through the diamond film) is about 6% of that of the latter case (through air). Although the energy loss attained to 94% of the input power, the transmittance of the diamond window of this invention was sufficiently high, because conventional windows had transmittances far less than 6% in general.

Therefore, the X-ray window of this invention excels in the flatness, the X-ray transmittance and the mechanical strength, because the transparent film and the crosspieces are made from diamond which is intrinsically a strong material highly transparent for X-rays and a change of temperature induces no thermal stress between the transparent film and the crosspieces.

What we claim is:

1. An X-ray window comprising an X-ray transparent film made from diamond, diamond reinforcing crosspieces formed on the X-ray transparent film and a supporting ring stuck to a peripheral part of the X-ray transparent film.

2. An X-ray window comprising an X-ray transparent film made from diamond, a ring substrate fitted to a peripheral part of the transparent film, diamond reinforcing crosspieces formed on the X-ray transparent film and a supporting ring stuck to a peripheral part of the substrate.

3. An X-ray window as claimed in claim 1 or 2, wherein the thickness of the X-ray transparent film is 0.05 to 10 $\mu$m and the thickness of the diamond crosspieces is bigger than that of the diamond X-ray transparent film.

4. An X-ray window comprising an X-ray transparent film made from diamond, a ring substrate fitted to a peripheral part of the transparent film, diamond reinforcing crosspieces formed on the X-ray transparent film and a supporting ring stuck to a peripheral part of the X-ray transparent film.

5. An X-ray window as claimed in claim 4, wherein the ring substrate is made from silicon, germanium, gallium arsenide, molybdenum or tungsten.

6. An X-ray window comprising an X-ray transparent film made from diamond, diamond reinforcing crosspieces formed on the X-ray transparent film and a supporting ring stuck to a peripheral part of the diamond reinforcing crosspieces.

* * * * *